United States Patent

[11] 3,585,851

[72] Inventor Karl G. Walther
 Hamden, Conn.
[21] Appl. No. 872,473
[22] Filed Nov. 24, 1969
[45] Patented June 22, 1971
[73] Assignee Krautkramer Ultrasonics, Inc.
 Stratford, Conn.
 Continuation of application Ser. No.
 546,423, Apr. 29, 1966.

[54] METHOD AND APPARATUS FOR IDENTIFYING DEFECTS WITH ULTRASONIC ECHOES
 8 Claims, 11 Drawing Figs.
[52] U.S. Cl. ................................................. 73/67.8,
 73/67.9
[51] Int. Cl. ........................................... G01n 29/04
[50] Field of Search ................................... 73/67.7,
 67.9

[56] References Cited
UNITED STATES PATENTS

| | | | |
|---|---|---|---|
| 2,667,780 | 2/1954 | Van Valkenburg .......... | 73/67.9 |
| 2,846,875 | 8/1958 | Grabendorfer ............... | 73/67.8 |
| 3,326,037 | 6/1967 | Stewart ....................... | 73/67.8 |

OTHER REFERENCES

Abrahams, C. J. "Practical Industrial Ultrasonic Examination," ULTRASONICS, Jan.— Mar., 1965, p. 30— 35.

Primary Examiner—James J. Gill
Assistant Examiner—John P. Beauchamp
Attorney—Watson, Cole, Grindle & Watson ABSTRACT: A method and apparatus for ultrasonic fault testing using angled probe beams wherein the probes are mounted on movable guide bars thereby enabling the probes to be moved in any one, or all, of three dimensions. The movement of the probes is indicated by potentiometer output and recorded on a strip chart along with the reflected signals from the probes. The location of the flaw is derived by the ratio of voltages representative of the distance between the probe and a reference axis and the distance travelled by the ultrasonic beam.

Inventor
Karl G. Walther

By
Watson, Cole, Grindle & Watson
Attorneys

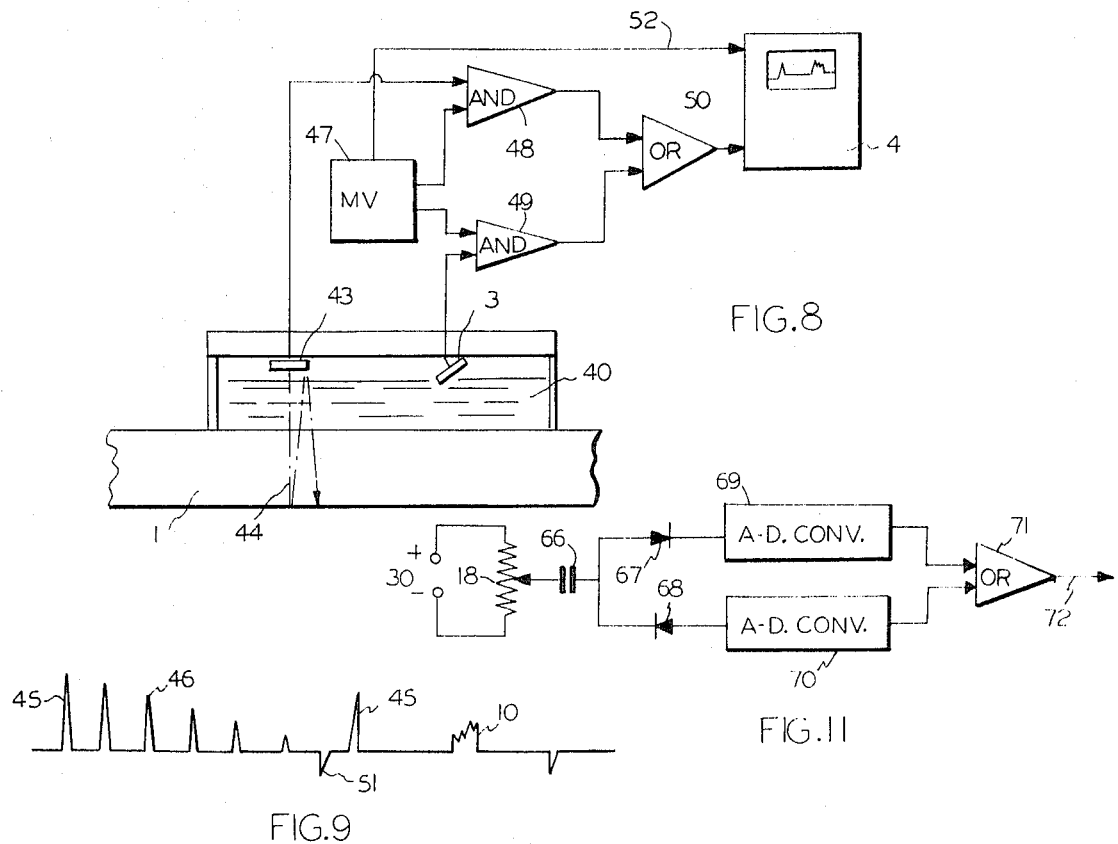
FIG.8
FIG.9
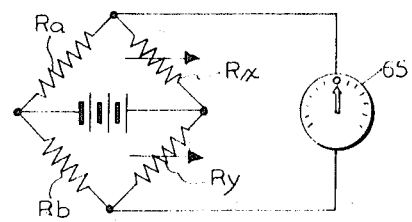
FIG.11
FIG.10

METHOD AND APPARATUS FOR IDENTIFYING DEFECTS WITH ULTRASONIC ECHOES

This is a continuation of application Ser. No. 546,423, filed Apr. 29, 1966.

This invention relates generally to ultrasonic fault-testing equipment and, more particularly, it relates to means for determining precisely the location and nature of defects in metal objects such as plates having welds.

Ultrasonic flaw detection is well known in the art as shown by U.S. Pat. No. 2,280,226 to Firestone, and certain techniques are known to improve this art, such as (1) techniques for angling a probing ultrasonic beam in U.S. Pat. No. 2,527,986 to Carlin, (2) techniques to transform the height of echoes in a selected time interval into a signal voltage (U.S. Pat. No. 2,507,854 R. B. de Lano, Jr.), and (3) techniques for recognizing the time interval between the transmitting pulse and defect echo represented by U.S. Pat. No. 2,494,990 to R. B. de Lano, Jr.

However, the prior art has essentially depended upon interpretation of echo signals to determine dimensions and characteristics by skilled operators after moving the probe positions and viewing the echo displays, but has not provided for appropriate apparatus in such ultrasonic weld testers for accurately recording and determining both the location and the nature of defects in such a manner that information is developed precisely while being preserved so that any calculations or interpretations contemporaneously made may be checked or analyzed at a later time. Such visual observations with human interpretation is limited generally to simple single dimensional analysis.

Accordingly, it is a general object of this invention to provide improved automatic ultrasonic methods and testing equipment for locating and identifying the characteristics of defects.

A more specific object of the invention is to provide ultrasonic testing equipment which permits analysis of defects by recording critical relationships between probe position and defect echoes so that both the position and nature of the defects and indicated.

Another object of the invention is to provide automatic ultrasonic testing equipment for simplifying calculations of exact defect locations in a body under test.

A further object of the invention is to provide ultrasonic test equipment and methods which provide nondestructive multidimensional viewing of faults or defects in a body.

In accordance with this invention therefore, an ultrasonic testing system is provided with recording equipment which correlates defect echo time position, duration and amplitude signals with probe position and attitude signals in such relationship that the exact nature of the defect is readily calculated. This equipment maintains the ability of the skilled operator to survey the defect by moving the probe position and attitude while observing defect echo response if desired but also provides for a complete three dimensional analysis in a routine manner.

Simplified calculating methods are provided by the invention to permit identification of defect positions by calculating a simple ratio of two distances. This leads to simplified automatic equipment which can be extended to more comprehensive systems incorporating development of recorded signals identifying the defect shape and characteristics in two or more dimensions.

Thus, the distance between an ultrasonic sending-receiving probe and the echo produced by ultrasonic techniques is measured as one parameter along a time base of a cathode-ray tube, for example. A further measurement is taken between the probe and a reference position or axis. A simple calculation of the ratio of these measurements then gives the location of the defect with respect to the reference position.

The position information thus developed may be recorded on a strip chart, for example, for future reference to check the calculated position or to analyze the characteristics of the defect. In the latter respect the defect position is scanned in at least one further dimension to display the echo reaction and to develop a record of the response of the defect echo to the ultrasonic beam impinging upon it from different directions.

Details of the invention along with further features and objectives will be found in the following specification which refers to the accompanying drawings, wherein.

Figure 6:
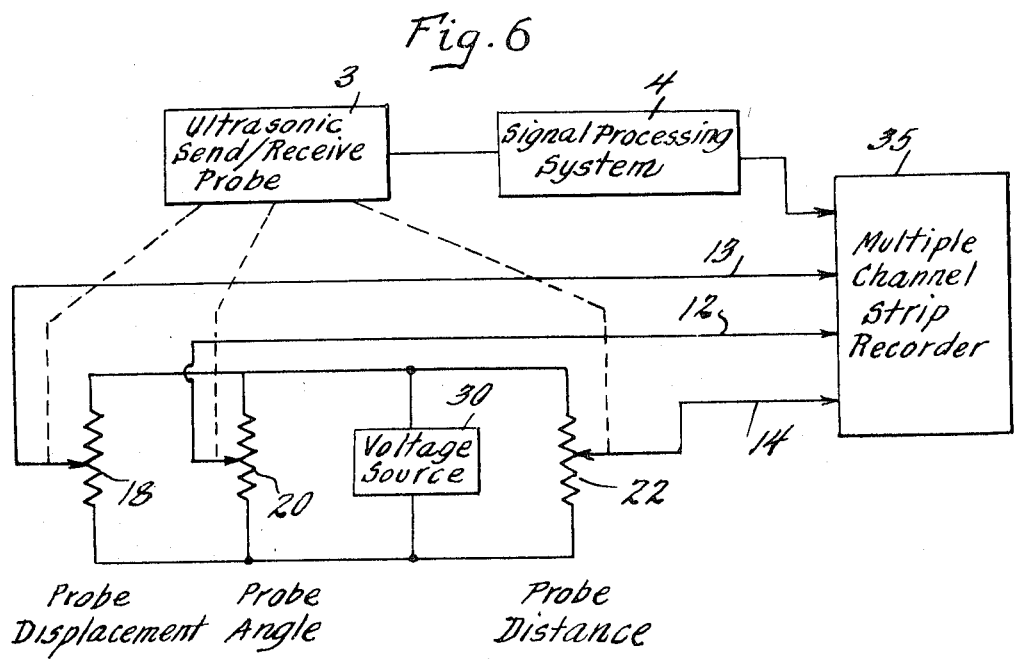
Figure 7:
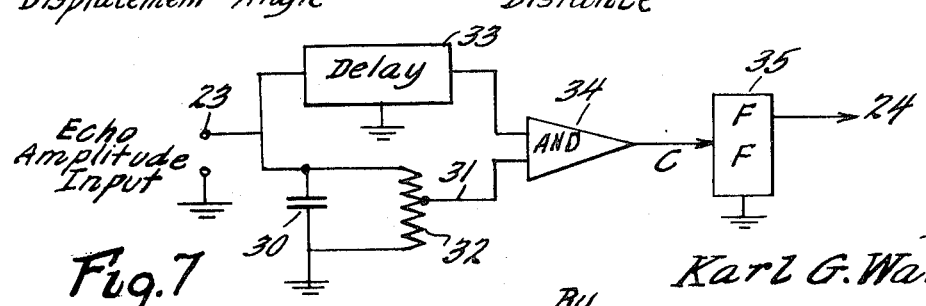

FIGS. 6—8 are block diagrams of ultrasonic weld-testing embodiments of several aspects of the invention;

FIG. 9 is a waveform diagram illustrating operation with the apparatus of FIG. 8; and FIGS. 10 and 11 are diagrams of further specific apparatus embodiments for providing signal voltages useful in this invention.

Figure 1:
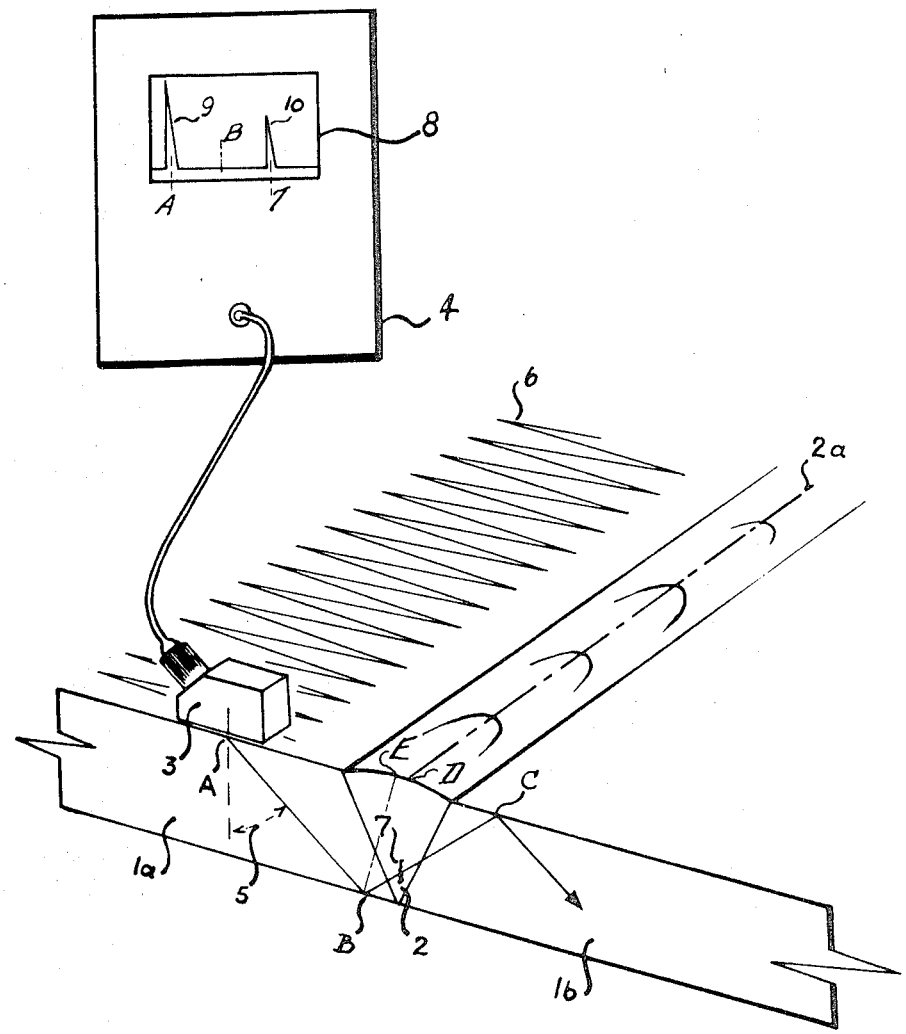
FIGS. 1 and 3 are diagrammatic perspective views of an ultrasonic weld-testing device showing the manner in which defects are precisely located and identified in nature.

The view of FIG. 1 illustrates certain principles and features of the invention with reference to a typical body under observation to observe defects. The body comprises two plates $1a$, $1b$ welded together at a weld seam 2, which is to be observed along weld axis $2a$ for any defects such as 7 occurring in the vicinity of the weld seam.

An ultrasonic probe 3 is positioned for sending and receiving ultrasonic signals into the plate through an intermediate coupling medium such as a liquid interface, in a conventional manner. Echoes reflected back from the plate under inspection such as from defect 7 are processed conventionally in the flaw detector system 4 to provide a display 8 with a time axis indicating the distance between the transmitted pulse 9 and received echo 10. The probe 3 is oriented to direct an ultrasonic beam into the plate at such an angle to the plate surface that the ultrasonic signal beam enters index point A at a known angle 5 between a vertical axis and the axis of the beam. The flaw detector system is of the general type described for example, in the aforementioned patents and serves to produce a visible echo pattern on a cathode-ray tube (CRT) for example, which relates the amplitude characteristics of the echo 10 received by bouncing back from a defect 7 in the path of the ultrasonic beam along a reverse path.

In order to permit simple vertical scanning through the entire weld seam at a desirable beam angle with simple motion, an appropriate beam angle is selected with the beam path being reflected at the rear side of the plate $1a$ at point B to traverse the weld seam 2 and further reflect from point C after which the beam is dissipated in passing through plate $1b$. A detectable portion of the energy is reflected from any defect 7 encountered in the weld back through the same path B—A to probe 3, to produce the echo display pulse 10 after a round trip propagation time to defect point 7 and back, which propagation time may be calibrated to read directly in distance to the defect on display 8. Thus, the transit time and distance are determinable in a conventional manner from known sound velocity in the plate material.

If we first consider only the necessity to scan vertically through the entire weld seam 2 in the narrow section observed by the ultrasonic beam, it may be seen that a back and forth movement of probe 3 will cause the beam axis portion B—C to move vertically through the entire cross section of the weld seam (or any equivalent designated zone of a body under test). Accordingly, the necessity is presented of determining the exact position of the defect 7 with reference not only to vertical position but also with reference to the lateral position in the zone being scanned. In this latter instance we can take as a reference position, the axis $2a$ of the weld seam for use in calculating the exact location of the defect 7 in these two dimensions.

In calculating the defect location in accordance with the procedures afforded by this invention, it is necessary only to use two distances, one of which is distance A—D between the beam entry position A and the reference axis point D, which in reality is simply known from the position of probe 3. The other distance is the beam path A-B-7 known from display 8. When these two distances are known the simple ratio A-D/A-B-7 will provide a value calibratable to give the distance of the defect to either side of the center point D for the different scanned distances A-D as the probe is oscillated back and forth.

A similar simple calculation may be made with the distance A-B, which is proportional to the thickness of the plate and thus the entire vertical distance through the plate and the distance B-7, which is proportional to the vertical position of the defect in the plate. This may be accomplished directly from the information available on the time axis of display 8 for example, by taking a reference position B (known from angle 5 and the thickness of the plate) from which the two distances A-B and B-7 are determinable.

It is therefore possible by a simple process to determine the exact location of a defect in the two-dimensional sense by showing a vertical height and lateral position. Simplified apparatus for automatically determining these locations is described hereinafter.

In order to extend this measurement to a full three-dimensional display, it is only necessary to move the probe 3 along a progressive zigzag path 6, which generally retains the weld seam 2 within beam region B-C along the entire depth of the plate extending along weld axis 2A. The distance along axis 2a can be measured directly from the probe location on the plate.

Figure 2:
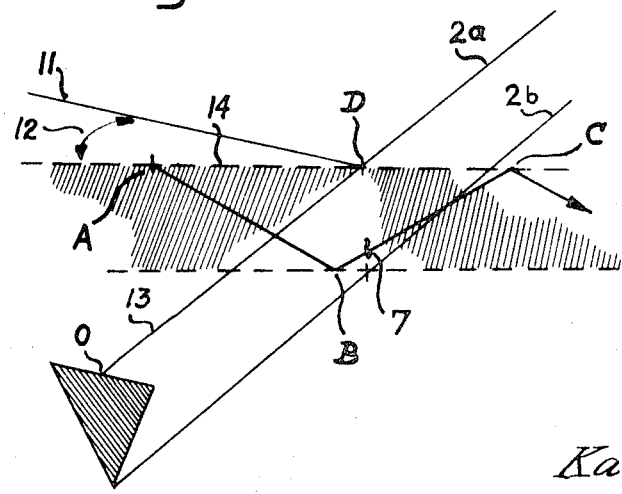
FIG. 2 is a sketch diagramming critical relationships in locating defect positions.

These simple geometric calculations may be visualized from FIG. 2, where a plane indicated by lines 2a and 2b passes through the center of the weld, whose end at the edge of the plate is shown at 0. The ultrasonic beam path A-B-C is shown intercepting defect 7, which is located below surface position D. The distance 14 indicates the location of the center plane 2a-1b from the probe index point A, and the distance from the edge of the plate OD is designated 13.

Angle 12 between a plane 11 normal to the center plane of the weld through 2a and 2b may be termed the orbital scanning angle which is used for purposes later discussed. The length of the path A-B-7 can be read from the display 8. Since the thickness of the plate is known and the probe angle 5, the calculation of defect position 7 for all three dimensions may follow in the preferred manner described or by alternative geometric calculations.

Also, the shape of the defect can be determined from the echo display 10 if the position of the probe 3 is permitted to scan or rotate about the vertical axis of the defect 7 at various probe spacings 14 to produce a scan pattern striking the defect with the beam from different directions. The shape is then determinable by referral to the echo height and shape. For example, a crack generates a maximum echo amplitude when the sound beam angle directly encounters its flat face normally and the echo amplitude denotes defect size while a gas bubble or spherical defect will exhibit the same echo amplitude from various probe positions.

Figure 3:
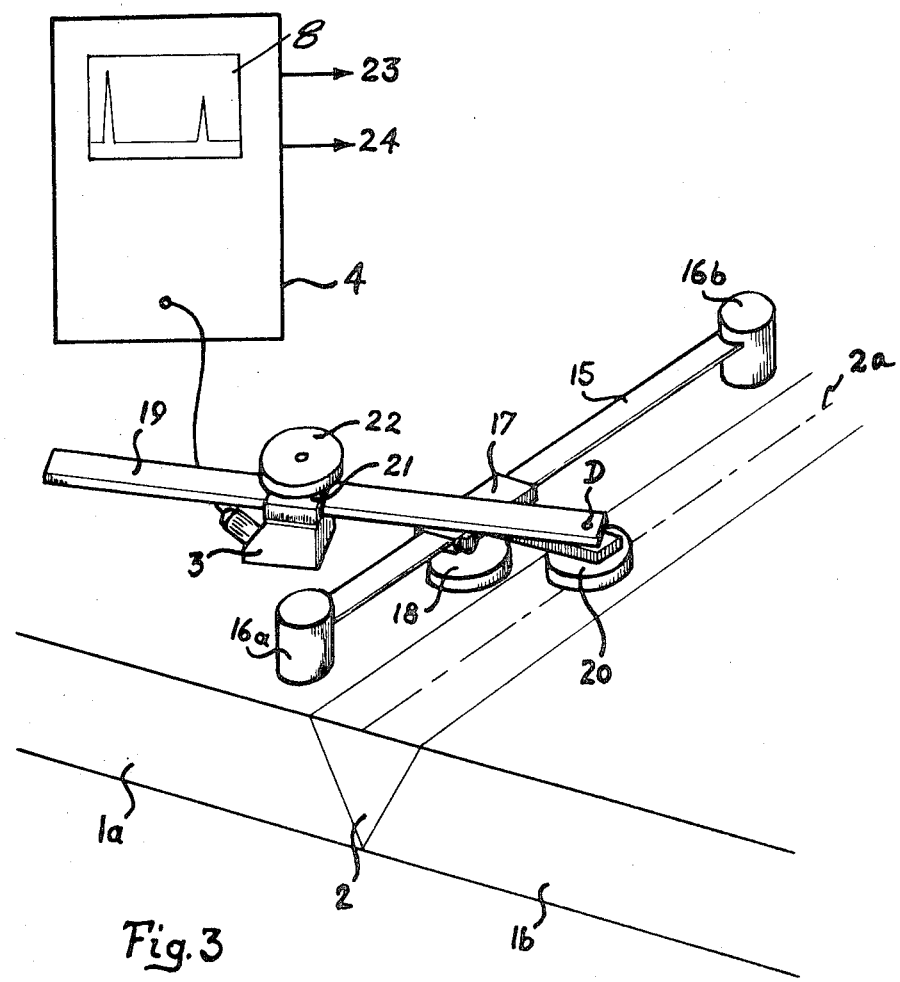
Figure 4:
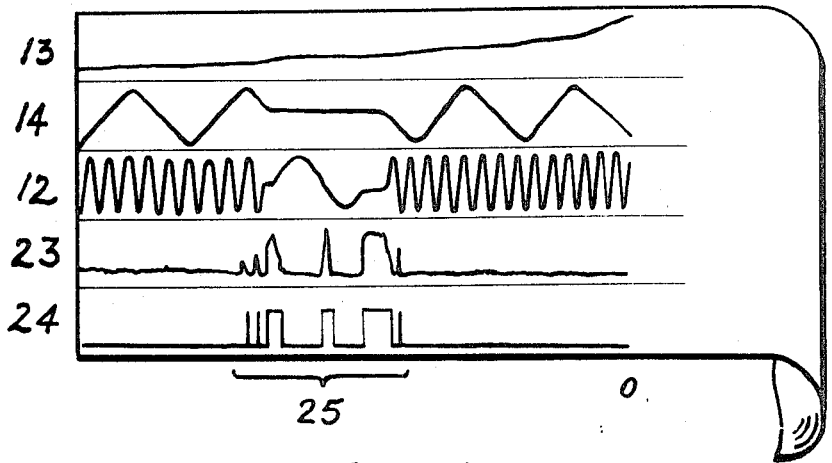
FIGS. 4 and 5 are waveform charts of recordings typically produced in accordance with this invention to display defect location and character.
Figure 5:
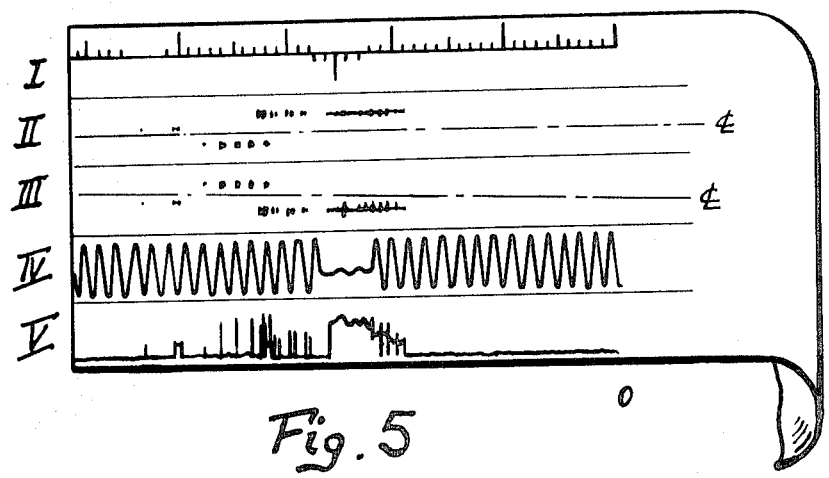

Accordingly, this invention provides for a guiding harness for positioning the probe as shown in FIGS. 3 and 6 to produce records such as shown in FIGS. 4 and 5. This equipment provides for determining exact probe position in a manner which can be correlated with echo shape so that the aforegoing calculations of position of the defect and analysis of the defect shape can be made precisely and checked for accuracy from a permanent record displaying all necessary criteria.

Referring now to the apparatus signified in FIGS. 3 and 6 representative of a preferred embodiment of the invention, it is seen that a flexible probe position is provided with position precisely designated at all times. Thus, a guiding rail 15 is mounted parallel to the weld seam axis 2a, or other reference axis, by such means as clamping magnets 16a and 16b. A cursor 17 rides on guiding rail 15 to traverse a path parallel to the weld seam axis 2a, and has an extension arm providing pivot point D directly over the weld axis 2a.

The position of the cursor along the axis is determinable as for example, from an electrical voltage from source 30 as developed by a movable tap on potentiometer 18, appropriately mechanically traversed across its range as the cursor changes linear position. This voltage is representative of the displacement 13 (FIGS. 2 and 4).

A probe-guiding bar 19 is pivoted about point D to permit movement of the probe 3 in an arc about the pivot point to supplement linear travel along the guiding bar 19. Thus, a further potentiometer 20 has its movable tap mechanically coupled to indicate a voltage proportional to the angle between the extended cursor arm and the guiding bar 19, and still another potentiometer 22 has its movable tap mechanically coupled to denote the distance of probe 3 along the guiding bar 19. Thus, the critical distances hereinbefore discussed are automatically developed for appropriate use in making calculations by either analysis of the charts of recorder 35 or by automatic computation in an analog computer. The mechanical positioning of all three potentiometers 18, 20, 22 by movement of the probe position is indicated by dotted lines in FIG. 6.

These variable voltages representative of probe position are directed to a conventional multiple-channel strip recorder 35 with known constant paper feed to afford a time base to produce the permanent records shown in FIG. 4, where signals 23 and 24 are obtained from the flaw detector and monitor system 4, and signals 12, 13, and 14 represent the voltages from potentiometers 18, 20, and 22.

Preferably, the chart has calibrated amplitude coordinates (not shown) in the various channels. Thus, channel 13 will display the probe displacement 13 along the axis corresponding to the distance O-D in FIG. 2, as derived from potentiometer 18. Channel 14 gives the corresponding distance A-D of the probe from the weld as derived from potentiometer 22, and the angular rotation representative of the orbital scanning angle is designated in channel 12 as derived from potentiometer 20.

The amplitude history of any echoes 10 is shown on trace 23, and trace 24 is a derivative of the echo signal which denotes the width across the defect. This latter signal is derived by sensing 50 percent amplitude points on the echo waveform and generating a resulting square wave signal over the resulting time duration between the 50 percent amplitude positions. Apparatus such as shown in FIG. 7 might be used, for example.

In this derivation system, the peak pulse amplitude is retained by capacitor 30 so that half its amplitude appears at tap 31 on resistor 32. When this coincides with either the rising or falling envelope of the echo delayed through delay line 33, then coincidence circuit 34 can complement flip-flop circuit 35 to change its state and thus generate the square wave signals at output lead 24. Thus, normally trace 24 will be offset somewhat from trace 23 because of the action of delay line 33. This delay should be at least half as long at the widest defect to be displayed.

The operation of this technique for determining defect width is necessary because of a finite ultrasonic beam width. Thus, as a beam begins to scan a defect, the amplitude of the echo increases to one-half its maximum amplitude until the beam axis reaches the edge of the defect, and in the same way exceeds this amplitude until the beam axis passes the opposite edge. As the entire beam width is impinging upon the defect therefore the amplitude is twice that at the edges. Thus, the signal trace 24 developes an easily interpreted visual record of the width of the defect which aids in analysis of the defect shape and characteristics.

An operator when encountering a defect in region 25 after moving probe 3 through a zigzag scanning pattern 6 of FIG. 1, shown on trace 14 with a superimposed cycling orbital scanning angle pattern shown on trace 12, may alter the probe movement pattern to develop signals on traces 23 and 24 representative of the shape of the defect. In essence, the zigzag motion (trace 14) is stopped along with displacement (trace 13) while a single orbital scanning cycle (trace 12) is effected over a longer time interval to permit echo signal amplitude history to be displayed on trace 23.

It is readily seen that the display in FIG. 4 gives the exact location of every defect indicated by an echo. The position either can be calculated by analog computing equipment or can be laid out on a graph. Furthermore, the width and amplitude of the echo display indicate the shape of the defect.

An additional indication of the record for monitoring performance of the equipment is desirable, and can be provided as shown in FIGS. 8 and 9. Normally a couplant such as an oil bath 40 is used between the ultrasonic probe 3 and the surface of plate 1. It is desirable therefore to monitor not only overall ultrasonic equipment performance but also the couplant operation, since the echo amplitude information is meaningless if the equipment is not properly calibrated.

Accordingly, in FIG. 8 an additional probe 43 (or alternatively a change of angle of probe 3) is used to project a sound pulse in beam path 44 into the plate so that it reflects back and forth between the two surfaces. This provides a relative amplitude between transmitted pulse reference 45 and succeeding echo pulses 46 of decreasing amplitude. The equipment may be adjusted for a calibrated return echo on the basis of these known conditions with vertical probe 43 to compare with the amplitude of a defect echo 10 reproduced from angularly positioned probe 3. This can be done on a test basis periodically or can be alternately displayed by use of a multivibrator 47 which alternately gates the respective probes 43 and 3 in coincidence circuits 48, 49 for viewing in combined form through mixer 50 in the flaw detector apparatus 4. A marker pulse 51 between the two traces may be developed through lead 52, if desired.

The defect position can be simply derived in accordance with the process afforded by this invention with an analog computation circuit such as shown in FIG. 10. Thus, by use of a simple balanced bridge in which both $Rx$ and $Ry$ are variable rather than the conventional use of only one variable, the ratio of $Rx/Ry$ will provide an indication on zero center meter 65 identifying position of the defect. Calibration and choice of resistance values is readily within the skill of those in the instrumentation art employing bridges.

An indication of the flaw position hereinbefore described by use of the ratio of distances A-D/A-B-7 can be produced with potentiometer 21 of FIG. 3 being resistance $Rx$ and with an additional potentiometer mechanically linked to a pointer for scanning the time display 8 of the flaw detector 4 to serve as resistance $Ry$ to display an equivalent distance A-B-7. Then meter 65 would display the position of the flaw 7 to the right or left of the centerline 2a of weld seam 2.

Using this technique a recording as displayed in FIG. 5 can be developed to produce a three-dimensional picture of the echoes received.

In this display trace I denotes the traversal of the probe along the reference axis (2a). This trace is displayed in quantized form for ready reference with polarization to indicate direction of travel. For example, as shown in FIG. 11 the indication may be derived from cursor potentiometer 18, through capacitor 66. Thus, positive and negative changes are channeled through rectifiers 67, 68 to analog to digital converters 69, 70 to produce digital marker pulses of opposite polarities, which may be combined in mixer circuit 71 for output on lead 72 which will operate recorder channel I.

Traces II and III may be derived from ratio circuits such as in FIG. 10 to produce a plan view display of echoes where distance from the centerlines¢ indicate position of the echo-producing defect and the dimensions of the echo indicate its height and width.

The dimension of the defects like a crack for instance can be derived either by the echo amplitude if there is a small flaw only, or by the presence of echoes dependent on traces I and II. Trace I shows the position in direction of reference axis to A and trace III indicates the depth of an echo-producing flaw referred to the surface of the specimen as a plate for instance.

Trace IV is the rotation angle similar to trace 12 of FIG. 4 and trace V is the echo amplitude similar to trace 23 of FIG. 4. It is seen therefore this display gives a full three-dimensional layout of the search pattern history and all echoes reproduced, so that not only are echoes analyzable but also the procedural operation in inspection of each echo is retained upon the record.

In some scanning patterns slight errors might be introduced which can be overcome in calibration devices such as nonlinear potentiometers or with compensating calculations made to layout scales, etc. Thus, even if zone scanning in the object under survey were accomplished by a pivotable probe, the method and apparatus of this invention would be useful with slight change.

It is also desirable at times when using the ratio techniques of this invention to use a simple offsetting technique to exaggerate significant signal amplitudes. Thus, consider in FIG. 2 that the ratio A-D/A-B-7 gives a small signal component when A-D and A-B are long. However, by selection of an index point at B, a ratio such as D-E/B-7 can be used to give a significantly larger component of ratio change or signal amplitude. This technique is particularly useful in displaying information from small defects on traces II and III of FIG. 5, for example.

While there is described what is at present considered a preferred embodiment of this invention, it will be obvious to those skilled in the art that various changes and modifications may be made therein without departing from the invention and it is, therefore, the object of the appended claims to cover all such changes and modifications as fall within the true spirit and scope of the invention.

What I claim is:

1. A method for determining the positions of defects in a material having known sound propagation velocity characteristics by means of ultrasonic pulses comprising the steps of:
    1. generating ultrasonic pulses within said material along a path having a predetermined acute angle with respect to a line normal to the surface of said material, said ultrasonic pulses are generated with an ultrasonic pulse generator probe movable along a guide member, said pulses also being transversely directed relative to a selected reference axis having a predetermined location along said material,
    2. moving said ultrasonic pulse generator probe in a direction parallel to said reference axis and rotating said ultrasonic pulse generator probe in a plane horizontal to the surface of said material about a pivoting point located on said guide member supporting the pulse generator probe,
    3. detecting pulses reflected from a flaw and determining the time interval between their entrance into said material and reflection from said flaw,
    4. deriving signals proportional to a reference displacement of the probe generator from the reference axis from signals proportional to the relative position of the probe from the reference axis when the pivoted end of the guide member is positioned at a predetermined point with respect to said reference axis and the angular position of the guide member relative to said reference axis and detecting ultrasonic pulses reflected from a flaw at said ultrasonic probe and deriving signals proportional to said time intervals representing pulse path lengths to the flaw,
    5. calculating the lateral location of the flaw from the reference axis using the signals in step 4.

2. A method according to claim 1 further comprising the step of further rotating said probe at selected spacings along said reference axis and measuring the amplitude of signals reflected from said flaw to determine its shape.

3. A method according to claim 2 further comprising the step of recording the signals obtained in step 3 along with signals representing said time intervals and the amplitude of signals reflected from said flaw.

4. A method according to claim 1 further comprising the step of calibrating the reflected pulse energy with a reference sound beam.

5. Apparatus for determining the position of defects in a material having known sound propagation velocity characteristics, comprising, means for generating ultrasonic pulses within said material along a path having a predetermined acute angle with respect to a line normal to the surface of said material, means at the generating location for receiving pulses reflected from said material, said pulses also being transversely directed relative to a selected reference axis having a predetermined location along said material, means for supporting said pulse-generating means to enable said generating means to be moved along an axis parallel to said reference axis lying in a plane horizontal to said surface and along an axis intersecting said reference axis at different angles, means for detecting movement of the pulse-generating means along said parallel and intersecting axes and means for determining the angular relationship between said intersecting and parallel axes and for generating signals proportional to such movement and angular relationship to produce signals proportional to the distance between the reference axis and said pulse-generating means, means for deriving signals proportional to the time interval between the entrance of said ultrasonic pulses in said material and the reception of said pulses by said means for receiving, and means for calculating the lateral location of the flaw from the reference axis from said derived signals and said proportional signals.

6. Apparatus according to claim 5 further comprising means for recording said signals proportional to the movement of the pulse-generating means, the signals proportional to said angular relationship, and the signals proportional to said time intervals.

7. Apparatus according to claim 6 further comprising means for calibrating the reflected pulse signals with a reference sound beam.

8. Apparatus according to claim 5 wherein said means for supporting rotates said pulse-generating means at selected spacings along said reference axis and said apparatus further comprises means for measuring the amplitude of signals reflected from said flaw to determine its shape.